Aug. 28, 1951     H. A. BACKUS     2,566,110
METHOD AND APPARATUS FOR STEREOSCOPIC PHOTOGRAPHY
Filed July 1, 1947     14 Sheets-Sheet 1
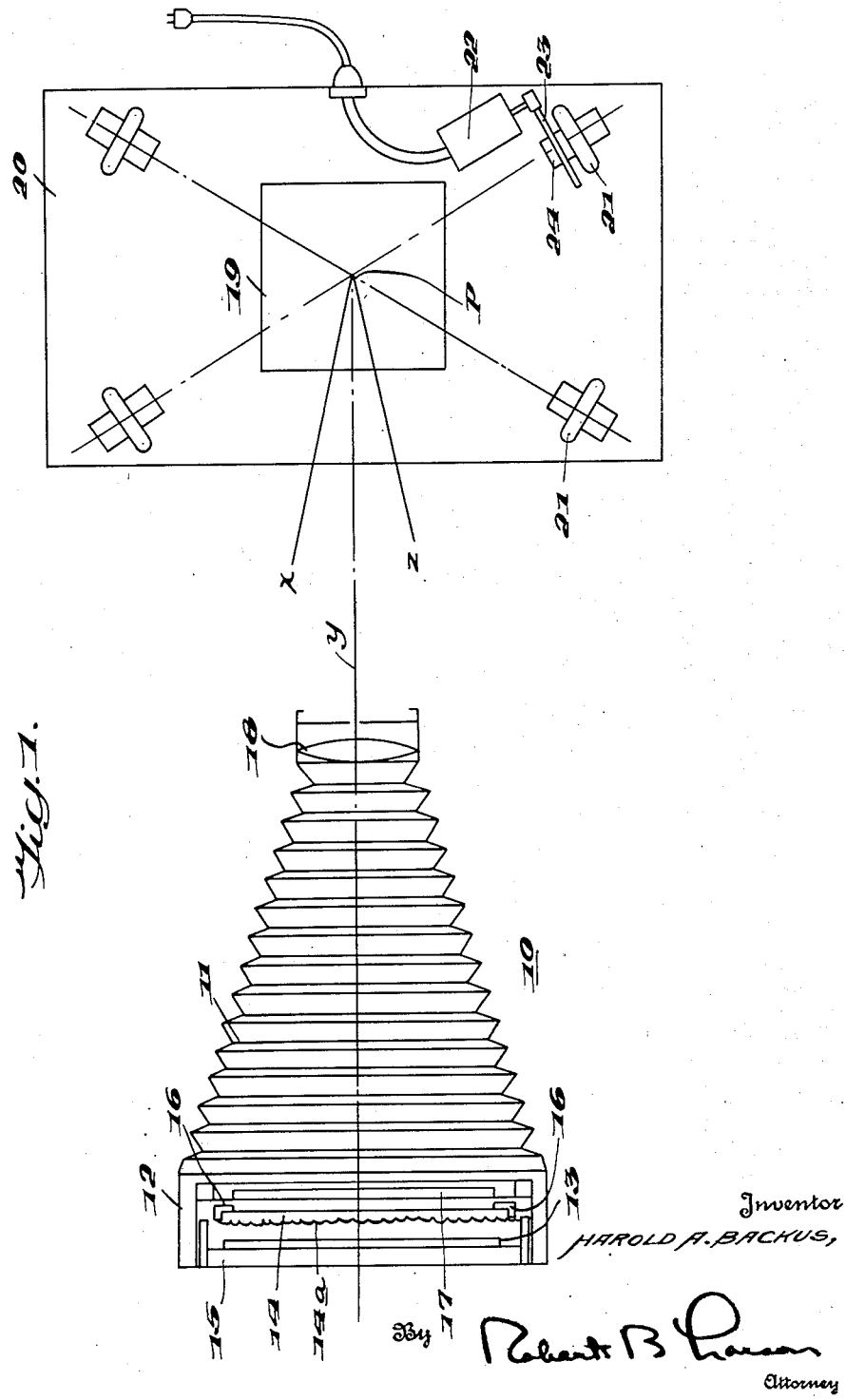

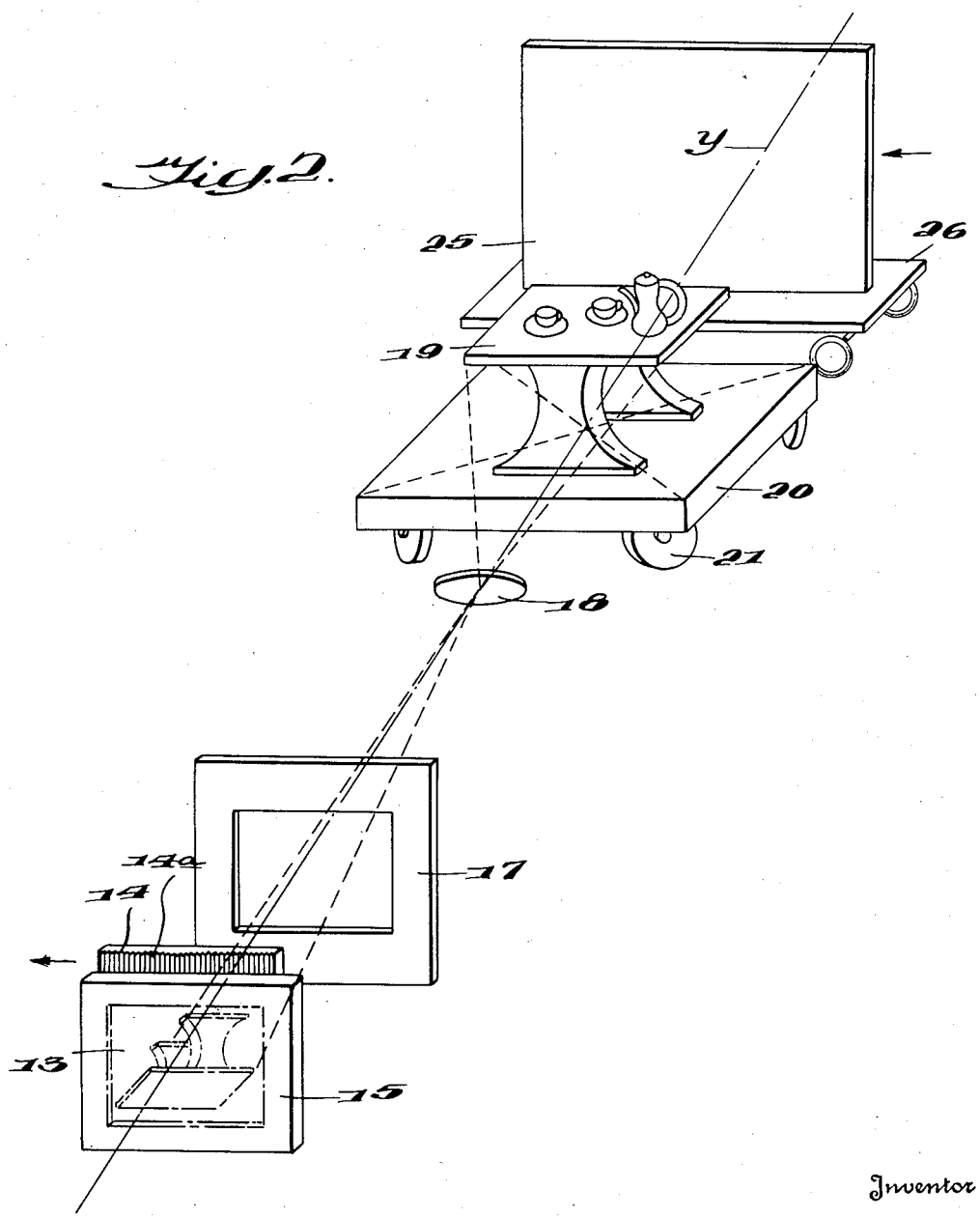

Aug. 28, 1951  H. A. BACKUS  2,566,110
METHOD AND APPARATUS FOR STEREOSCOPIC PHOTOGRAPHY
Filed July 1, 1947  14 Sheets-Sheet 3
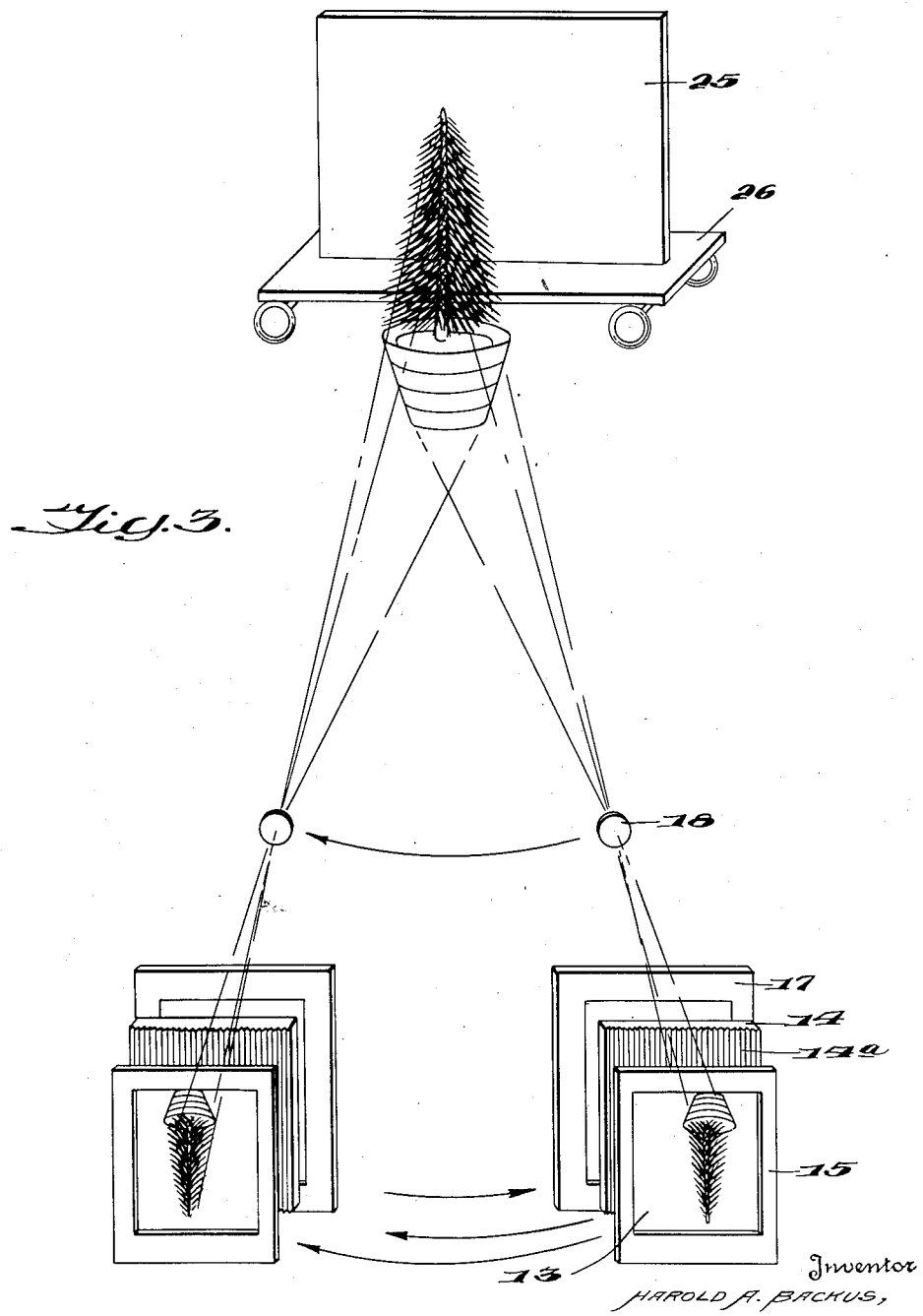

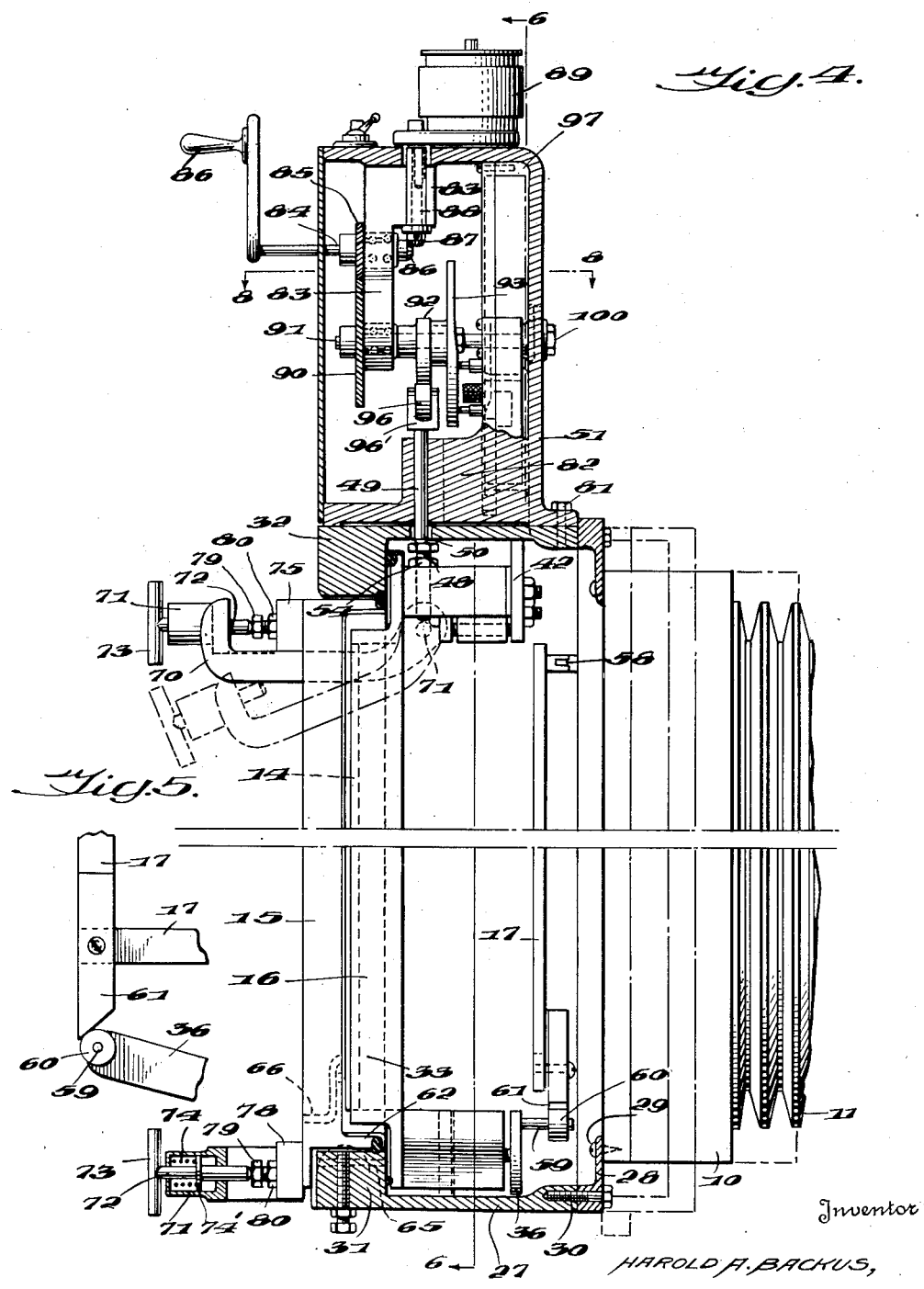

Aug. 28, 1951    H. A. BACKUS    2,566,110
METHOD AND APPARATUS FOR STEREOSCOPIC PHOTOGRAPHY
Filed July 1, 1947    14 Sheets-Sheet 5

Inventor
HAROLD A. BACKUS,
By Robert B. Larson
Attorney

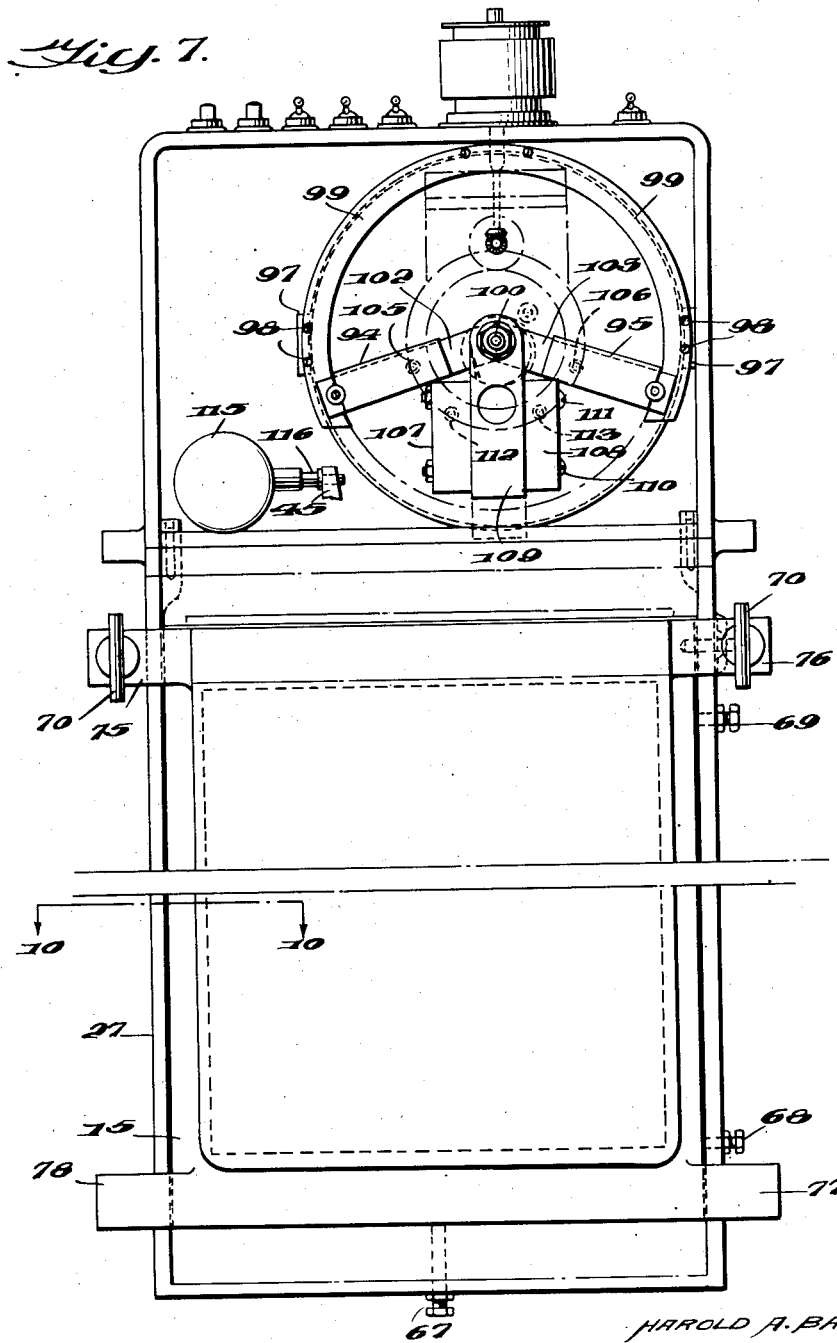

Aug. 28, 1951 H. A. BACKUS 2,566,110
METHOD AND APPARATUS FOR STEREOSCOPIC PHOTOGRAPHY
Filed July 1, 1947 14 Sheets-Sheet 7

Inventor
HAROLD A. BACKUS,
By Robert B. Pierson
Attorney

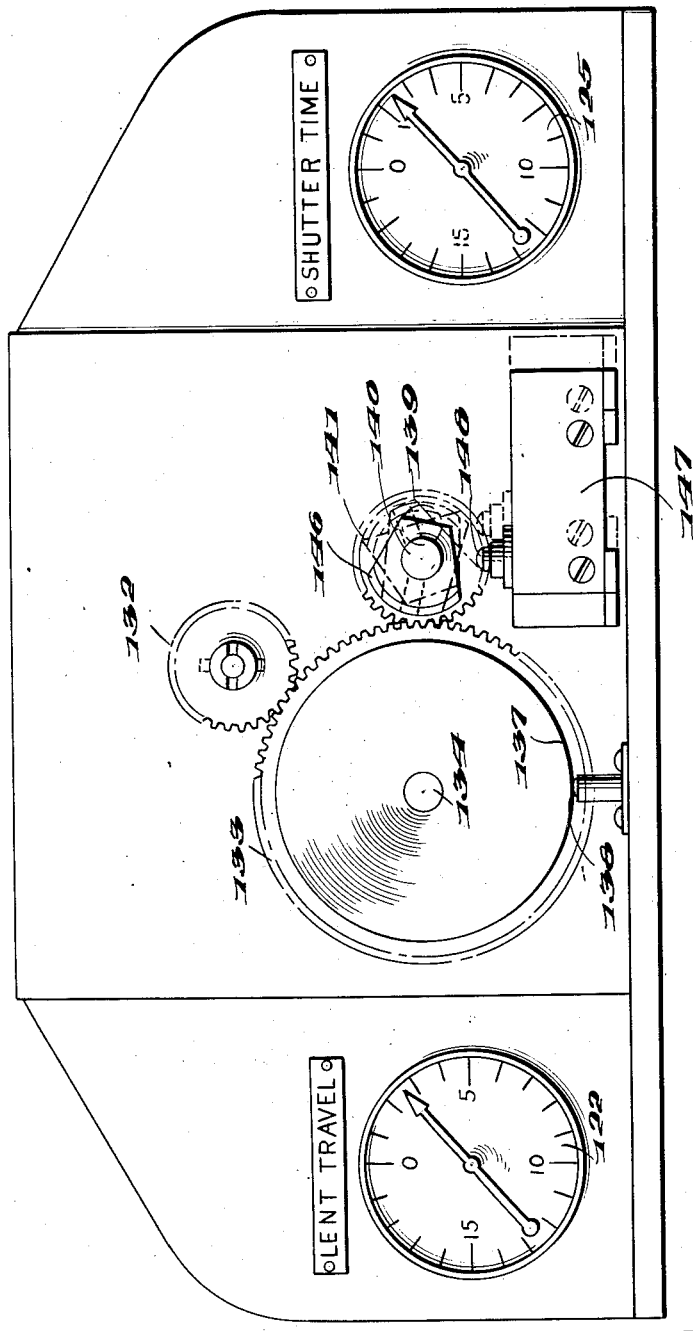

Aug. 28, 1951  H. A. BACKUS  2,566,110
METHOD AND APPARATUS FOR STEREOSCOPIC PHOTOGRAPHY
Filed July 1, 1947  14 Sheets-Sheet 9
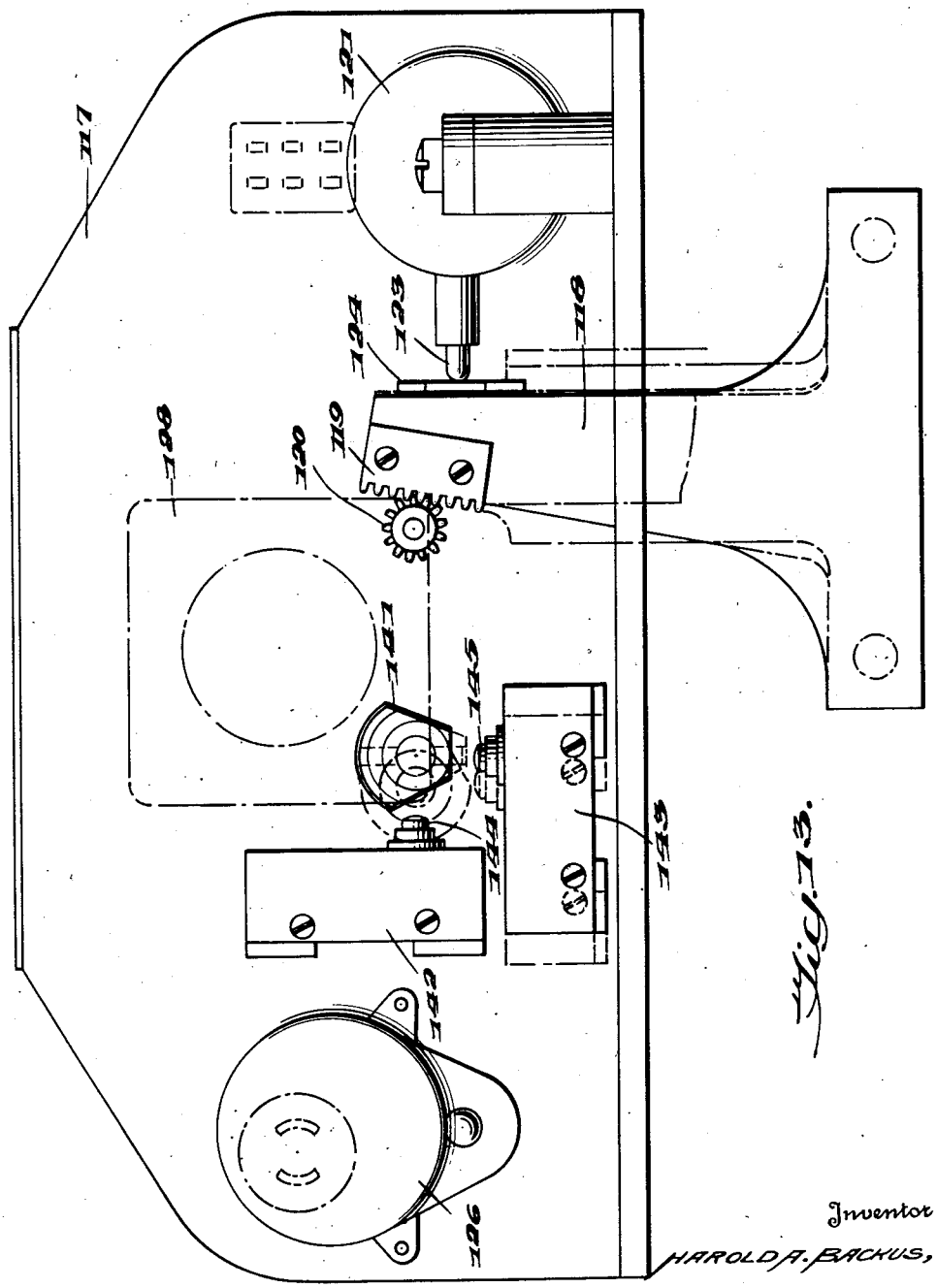

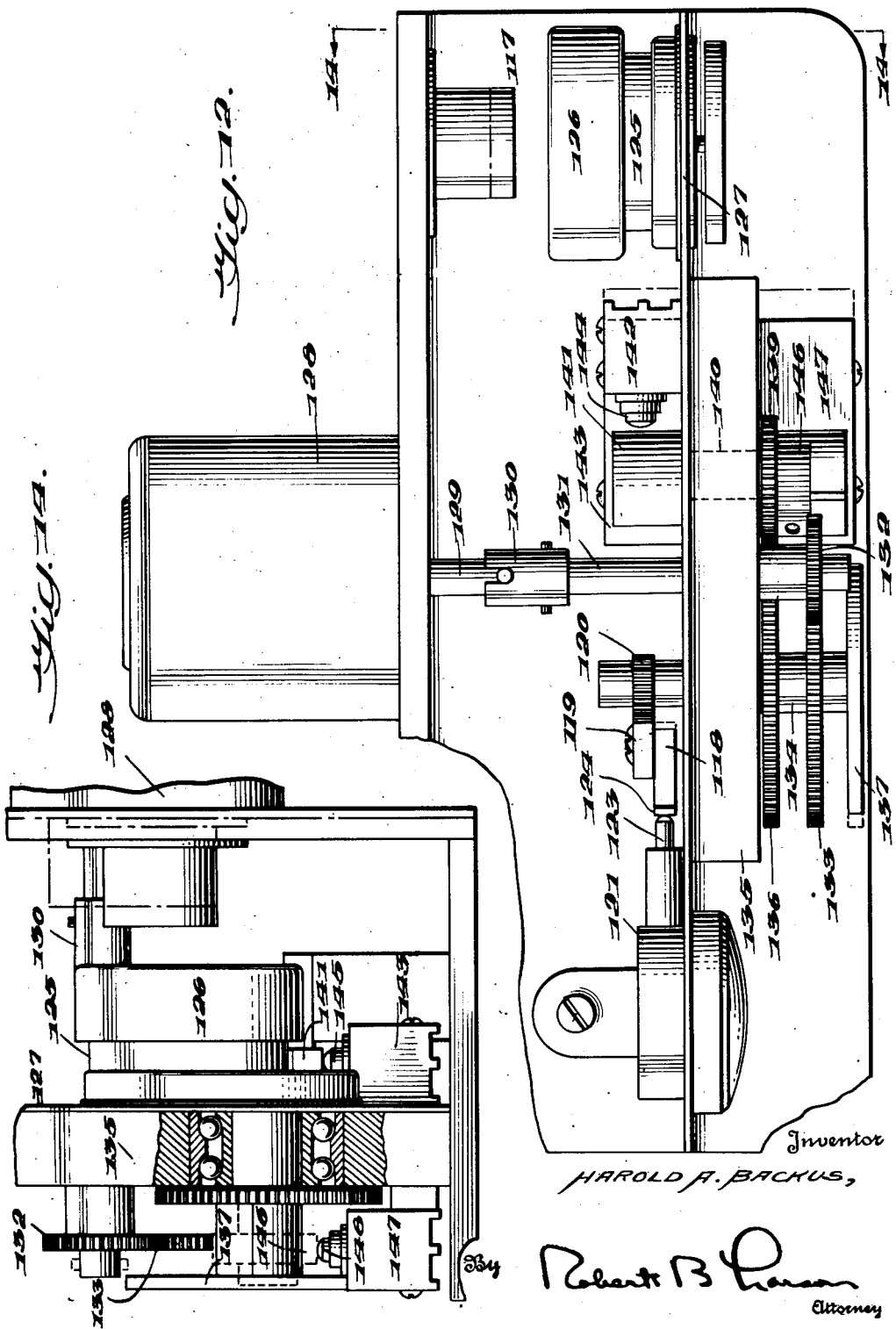

Aug. 28, 1951　　　　H. A. BACKUS　　　　2,566,110
METHOD AND APPARATUS FOR STEREOSCOPIC PHOTOGRAPHY
Filed July 1, 1947　　　　　　　　　　14 Sheets-Sheet 11
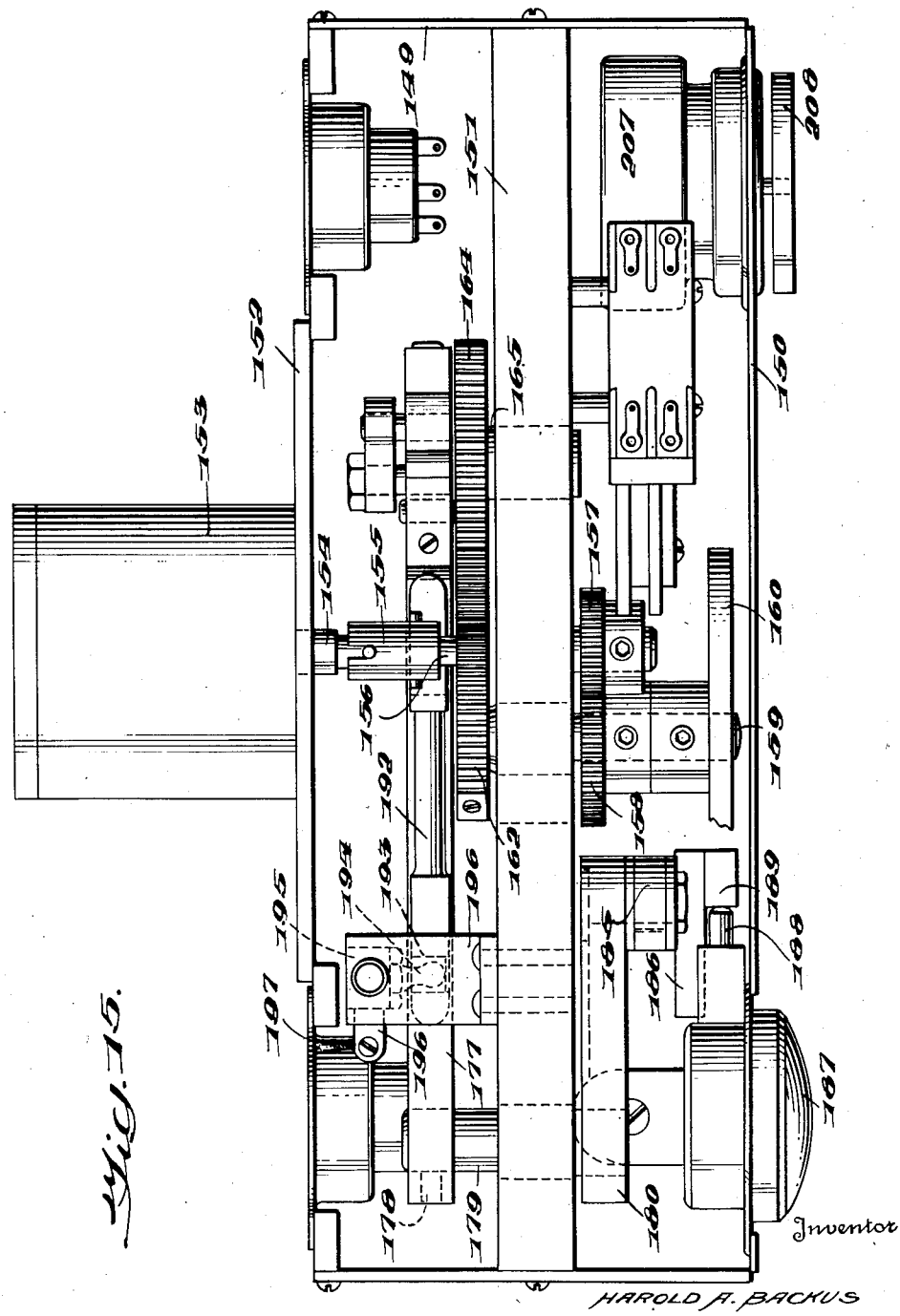
Inventor
HAROLD A. BACKUS
By Robert B. Larson
Attorney Aug. 28, 1951  H. A. BACKUS  2,566,110
METHOD AND APPARATUS FOR STEREOSCOPIC PHOTOGRAPHY
Filed July 1, 1947  14 Sheets-Sheet 12

Inventor
HAROLD A. BACKUS,
By Robert B Larson
Attorney

Aug. 28, 1951     H. A. BACKUS     2,566,110
METHOD AND APPARATUS FOR STEREOSCOPIC PHOTOGRAPHY
Filed July 1, 1947     14 Sheets-Sheet 13
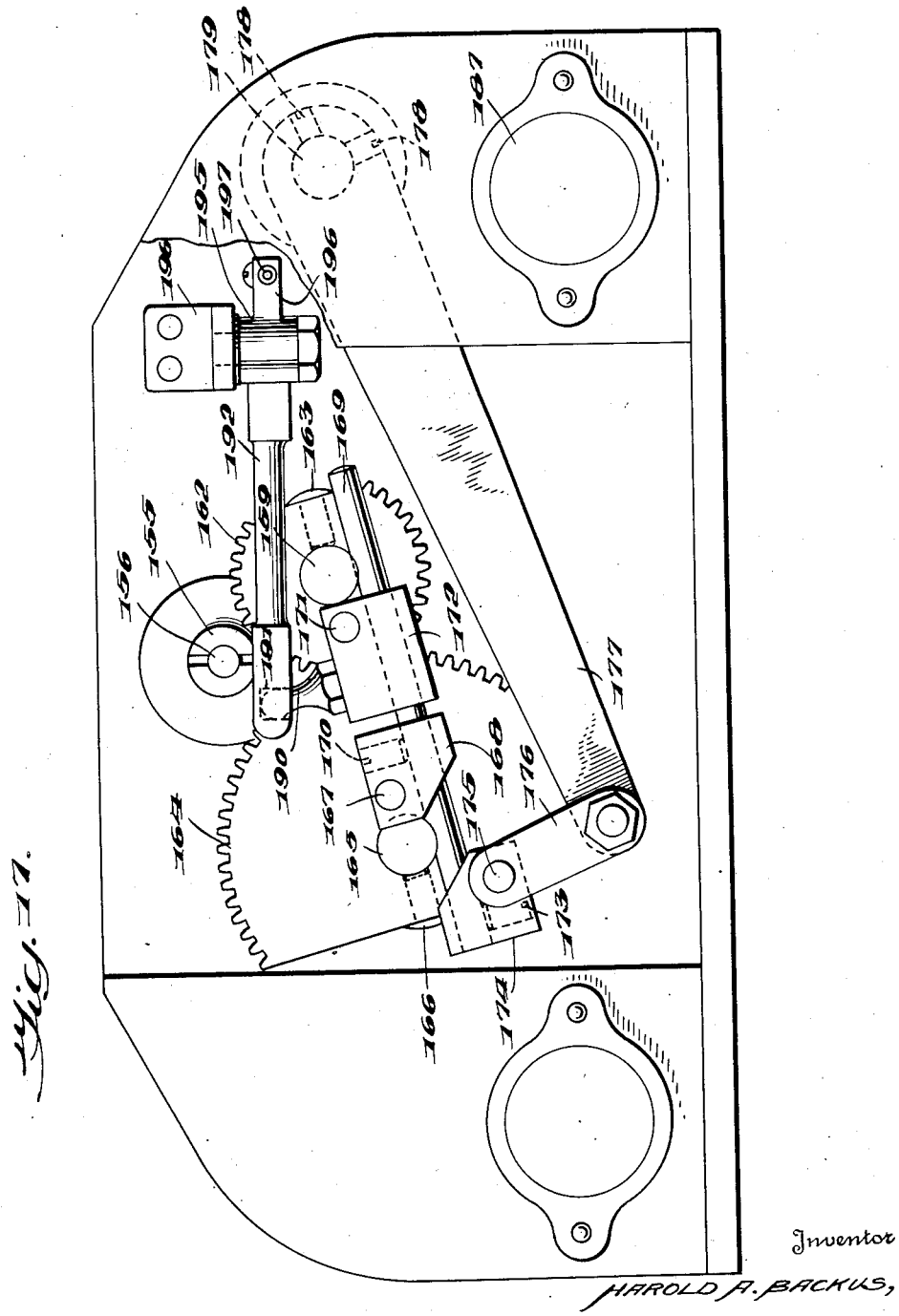
Inventor
HAROLD A. BACKUS,
By Robert B. Larson
Attorney

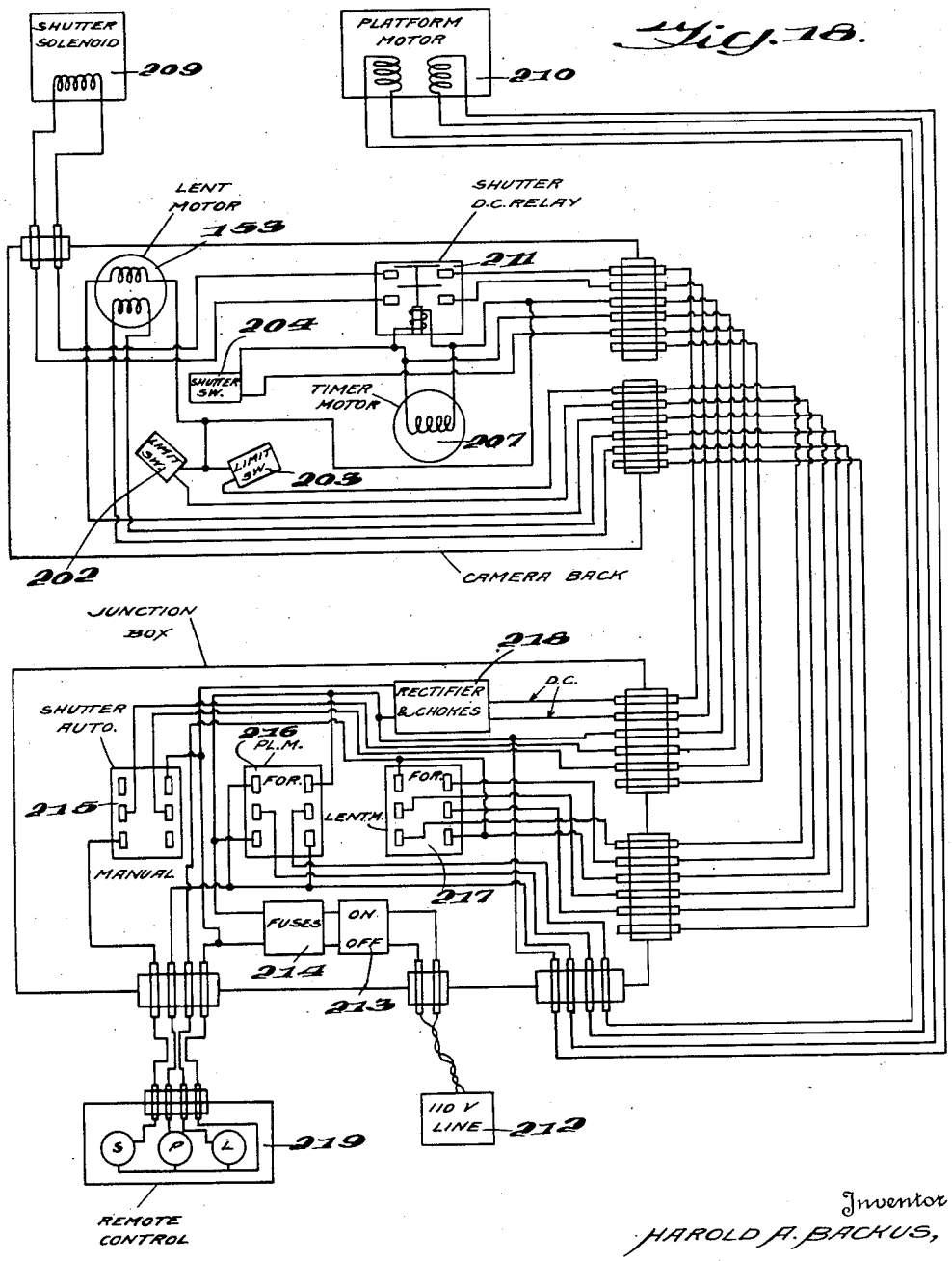

Patented Aug. 28, 1951

2,566,110

UNITED STATES PATENT OFFICE 2,566,110

METHOD AND APPARATUS FOR STEREOSCOPIC PHOTOGRAPHY

Harold A. Backus, Merion Station, Pa., assignor to Bond Displays, Inc., Philadelphia, Pa., a corporation of Pennsylvania Application July 1, 1947, Serial No. 758,431

23 Claims. (Cl. 95—18)

This invention relates to a method and means for producing stereoscopic pictures of the type which exhibit binocular stereoscopic relief when viewed through a suitable viewing means.

Pictures of the type to which the invention relates are well known in theory in the prior art and have there been described as a composite image containing parallel panel views of an object field as seen from a plurality of points of view. Moreover, such an image is a composite image composed of a plurality of such panels, different panels containing different portions of the object field on which the camera is focussed, and a single portion of said object field occurring in a plurality of panels.

It is of course known that such pictures can be produced by disposing a transparent lenticular element between the lens of the camera and the sensitized surface or emulsion, which lenticular element, for example, may have one surface formed with a series of parallel, vertical, convex ribs. When relative lateral movement is then effected between the camera elements and the object being photographed, the lenticular causes a composite image of the type referred to to be formed on the sensitized surface. When such an image, either negative or positive, is viewed through a properly matched transparent lenticular, some illusion of depth or stereoscopic relief is produced.

While in theory such methods have been sound, the results produced in commercial practice have, up to the present time, been most discouraging, and while many have devoted their time and energies to the production of such pictures for a great number of years, no practical commercial results have been obtained.

As early as the patent to Kanol No. 1,260,682, it was realized by some that the depth effect could be enhanced in methods of this general type by effecting a relative lateral movement between the sensitized surface and the lenticular during the time the sensitized surface is exposed to the object. The present invention has for its principal object the production of pictures having a greatly enhanced depth effect by a method which consists broadly in effecting a plurality of relative movements of a number of elements, in addition to the object being photographed, which modify the light passing to the sensitized surface during the taking of the picture.

In accordance with the present invention it has now been found that the depth effect can also be greatly enhanced in certain instances, not only by effecting the relative movements to which reference has been made, but by also varying the speed of such relative movements or certain of them during the time they are occurring. It is an important object of the invention to provide a method and means for effecting such speed changes.

It is a further object of the invention to provide a method and means for correlating the various relative movements which have been mentioned. Still further, in accordance with one of the features of the invention these movements or certain of them are correlated with an adjustable lens aperture so as to vary the aperture opening during such movements so as to control the photographic density and to increase the depth effect even to a greater extent.

In accordance with another feature of the invention the depth effect in the final picture is increased by causing the picture margin or frame to be stereoscopically moved forwardly or backwardly relative to the main body of the picture itself. This may be accomplished in one method according to the invention by employing a margin frame element which is disposed between the lens and the lenticular, and by moving this frame element during the taking of the picture. Depending on the direction of lateral movement of the frame element with respect to the lenticular and the sensitized surface, the finished picture will be provided with a picture margin or frame which will appear to be either in front of or behind the object being photographed. The invention also provides means for moving this frame element relatively to other elements which modify the light passing to the sensitized surface, and for controlling the movement of such frame element.

It is within the contemplation of the invention that the "margin" referred to above can be added as a printed border to any picture and does not necessarily have to be applied to the negative at the time the negative is lenticulated.

Structurally, the invention provides a special camera back which may be detachably secured to a standard studio camera and which camera back structure may be provided with a special film holder, a holder for the lenticular, a holder for the frame element, and means for effecting relative movement between such elements and for controlling the direction of movement thereof, the speed thereof, and also for varying the speed of movement thereof during the taking of the picture. It is an object of the invention to provide such a structure.

These and other objects of the invention will become more apparent from the following description and claims when read in conjunction with the accompanying drawings, in which:

Fig. 1 is a diagrammatic plan view of one arrangement in accordance with the invention;

Fig. 2 is a modified diagrammatic perspective view of the same;

Fig. 3 is a similar perspective of another arrangement;

Fig. 4 is a vertical longitudinal section taken through a special camera back and control unit constructed in accordance with the invention;

Fig. 5 is an enlarged detail of the mechanism for moving the margin frame;

Fig. 7 is a rear elevation of the special camera back and control unit, the rear wall of the control unit having been removed;

Fig. 11 is a rear elevation of a modified form of control unit with the rear cover of the central portion thereof removed;

Fig. 12 is a top plan view of the same with the top removed;

Fig. 13 is a front elevation view of the same with the front wall removed, the figure also showing the upper portion of the mechanism for supporting the lenticular for movement;

Fig. 14 is a view taken on the line 14—14 of Fig. 12, and being partially in section;

Fig. 15 is a top plan view of a preferred form of control unit, with the top wall removed;

Fig. 16 is a rear elevation of the same with rear wall removed;

Fig. 17 is a front elevation of the same with the central portion of the front wall removed, and Fig. 18 is a diagrammatic view of an electric circuit for said control unit and the elements controlled thereby.

Figure 6:
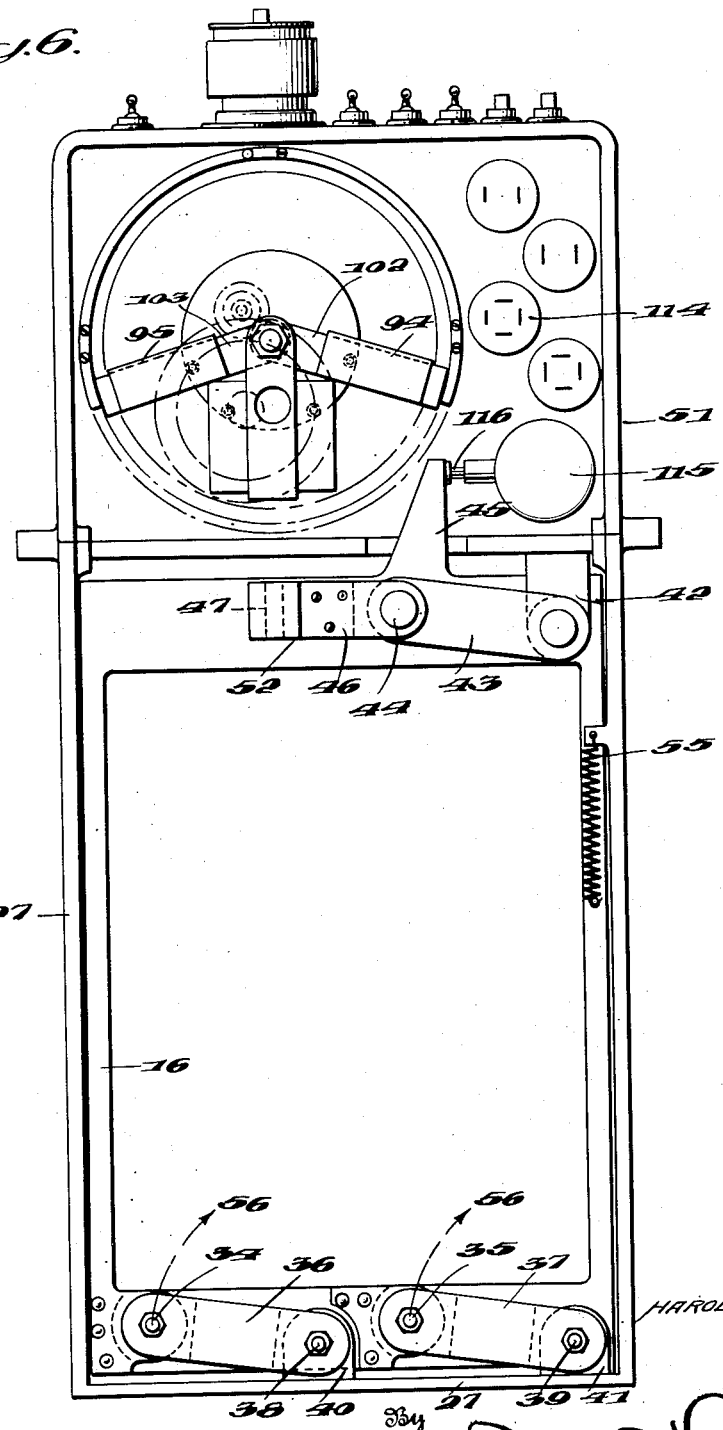
Fig. 6 is front elevation taken on the line 6—6 of Fig. 4.

While various forms of apparatus may be employed in carrying out the inventive concepts, the principal example of the invention here illustrated and described employs a stationary camera provided with a transparent lenticular screen between the lens and the film. The object to be photographed is preferably placed on a platform which is mounted for rotation around a center point which is disposed on or near the optical axis of the camera. Such an arrangement is shown very diagrammatically in Fig. 1 which is a plan view. Fig. 2 is a perspective view of the arrangement, which view is also very diagrammatic.

With reference now to these figures, the camera 10 having the usual bellows 11, is provided at its rear with an open ended casing 12 in which the film 13 is disposed. Disposed forwardly of the film 13 and in adjacent but spaced relationship thereof, is a transparent lenticular screen 14 which hereinafter will be referred to simply as the lenticular. The film 13 is supported by a film holder 15.

The lenticular 14, in the example shown, has a flat forward surface, while its rear surface is formed with a plurality of small substantially semi-cylindrical convex ribs 14a which are directly adjacent and parallel to each other. The lenticular 14 may be of any suitable transparent rigid material, but preferably is of a transparent plastic. The lenticular 14 is mounted in a holder 16 parallel to the film 13 and the holder 16, in turn, is mounted for a slight component of movement in its own plane in a direction at right angles to the length of said convex ribs, so that during the picture taking operation the lenticular 14 may be so moved in the direction of the arrow in Fig. 2.

Disposed within the camera 10 and forwardly of the lenticular 14, is a picture edging or margin frame 17 which is disposed in a plane parallel to the film 13 and is mounted for movement in its own plane laterally in either direction. The purpose and operation of this frame 17 will be described hereinafter.

The camera lens 18 preferably is a high quality process lens and is provided with a shutter and aperture arrangement of any type well known in the camera art.

The objects to be photographed are shown in Fig. 2 as comprising a pitcher and two cups and saucers which rest on a small table 19 which is placed on a platform 20. The platform 20 is provided with rollers 21 which are positioned so that the platform may be rotated about a vertical axis passing through the point P. The platform 20 may be rotated by various means, one of which is diagrammatically illustrated in Fig. 1, as comprising an electric motor 22 connected to drive a gear 23 on an axle shaft 24 on which one of the rollers is secured. It will be noted from both Figs. 1 and 2 that the pivot point P is always positioned near or on the optical axis Y of the camera 10.

In Fig. 2 there is also shown a background screen 25 which is disposed on a wheeled support 26 so that the screen 25 may be moved laterally in the direction of the arrows.

It will thus be apparent that the type of apparatus illustrated here for the purpose of explaining one embodiment of the invention, comprises an arrangement in which, as the picture is being taken, the object is slowly rotated while at the same time the lenticular 14 is moved in its plane.

It should be apparent that such lateral movement of the lenticular has the effect of moving the image on the emulsion of the film as the picture is being taken and thus causes the effect of depth in the final picture.

Moreover, an increase in the depth effect is obtained by the lateral movement of the background screen 25 during the picture taking, particularly if the rate of angular movement of this screen about the lens as an axis is greater than the rate of angular movement about said axis of any part of the object group.

The margin frame 17 which also moves laterally, comprises in effect a sliding mask which produces the illusion, in the finished picture, of a margin to the rear or to the front of the plane of the main picture body, as desired. This frame is operated in synchronism with the lenticular 14 but in the opposite direction if it is desired to project the frame to the rear of the picture itself. To make the frame appear to be well out in front, the motion should be the same as that of the lenticular 14. Both effects may be desired. For instance, a "keyhole" picture could be made with such a front framing in spite of the fact that the motion of the object and its lenticulation was such as to make it project forward, but not as much.

This mask or frame 17 is preferably placed just in front of the lenticular 14 in order to get the sharpest edge outline to the frame or margin which is thus made a part of the subjects visible behind the lenticular screen. The purpose is to make the frame or margin of the same kind as the picture proper, that is, appear to be lenticulated, and thus permit it to be "scene shifted" with respect to the rest of the picture. If the frame or mask is nearer the lens, a blurred outline results. Some effects may be useful with this quality but what would be preferable and quite effective would be a soft rounded or "bent" edge of the frame being turned inward. This would probably reduce the blurring which results from lack of exact register between the lenticular and the picture where the latter is separately developed.

This lenticulated margin or frame can be printed in the negative at the time the lenticular itself operates on the picture image. However, a separate "picture" of such a margin can be made and separately printed by press work on the periphery of the positive or negative picture, complete with the runout on the inner edges bordering on the picture space, and then the picture itself can be printed over this, showing through the runout just as though the frame and the picture were taken and lenticulated together.

A third dimensional effect can be obtained with an arrangement employing a system in which, during the picture taking, there is relative lateral motion between the object and the lenticular. Broadly, the principal purpose of the present invention, as indicated, is to increase that depth effect greatly by introducing one or more additional relative lateral movements. These are produced by moving the lenticular edging frame 17 and the background screen 25 in addition to rotating the object. Moreover, in some instances, as will be described, one or more of such movements may be accompanied by movement of the camera 10 and the lens 18 with respect to the object, and there may also for some cases be relative movement between the camera and its lens. In all events, the object is to increase the depth effect in the final picture by such movement. It is, of course, apparent that each of these movements must be accurately prescribed and controlled.

It should be clear that in some instances it may be desirable to keep the object stationary and to swing the camera in an arc about the center of the object. Such a system has been diagrammatically represented in Fig. 3 in which elements similar to those in Figs. 1 and 2 have been given like reference numerals. Here also it is possible to effect a considerable number of relative movements between the various elements such as the film, the lenticular, the margin frame, the background frame, the lens, and the object. Here also it should be remembered that with regard to the margin frame it should be moved toward the right relative to the film 13 in the figure if, in the finished picture it is to appear to be behind the pivot point (the object), while if it is desired that it appear ahead of the pivot point it should be moved in the opposite direction but naturally at a different rate of speed than movement of the lenticular.

Referring again to the arrangement of Figs. 1 and 2 one practical mechanism for effecting the movements of the lenticular 14 and of the margin frame 17 is illustrated in Figs. 4 to 10 inclusive. In this embodiment the camera 10 which may be of a standard portrait studio type, is provided with the usual bellows 11 and with a special, removable back structure which is enclosed within a main casing 27. The main casing 27 is adapted to be removably secured to the rectangular rear open end of the camera 10 by means of a rectangular accommodation plate frame 28 which may be secured to the camera by means of screws 29 or the like. The accommodation plate frame 28, as shown, extends laterally outward from the camera in all directions and the main casing 27 is secured thereto by means of the screws 30, as is perhaps best shown in Fig. 4.

The main casing 27 is open at the rear, but the rear rectangular opening is adapted to be closed by a removable film holder 15, the special nature of which will be described shortly. The main casing has a shoulder 31 extending upwardly into the rear opening and another shoulder 32 depending downwardly. The lenticular 14 and its holder 16 are positioned within the casing 27. The lenticular 14 may be of the type heretofore mentioned which is provided with vertical parallel convex ribs on its rear surface which ribs in section are less than semi-cylindrical. The lenticular holder 16 is generally in the shape of a rectangular frame having a lenticular engaging portion 33. As shown in Fig. 6, the bottom of the lenticular holder 16 is pivotally connected as at 34 and 35 respectively to two links 36, 37, the other ends of the links being pivoted as at 38 and 39 to fixed supports 40, 41 secured to, or forming an integral part of the main casing 27.

A support or boss 42 rigid with the main casing 27 extends inwardly from the casing near the upper end thereof, and comprises a pivotal axis for a link 43. The link is pivotally connected as at 44 to the lenticular holder 16. The link 43 has an upwardly extending dial indicator operating arm 45 and also an arm 46, both of which form rigid portions of the link 43. The arm 46 is provided with a threaded vertical hole 47 which receives the threaded end of an adjusting bolt 48. Abutting the upper end of the bolt 48 is a push rod 49 (Fig. 4) which extends upwardly through a hole 50 in the main casing 27 into a control unit 51. As will be hereinafter described, the push rod 49 is actuated in an up and down movement by control mechanism in the control unit. The reference numeral 52 indicates a lug on the screen holder the purpose of which is to guide the arm 46 in its movement. It will be noted that the position of the bolt 48 may be adjusted by means of the bolt head 53 and lock nut 54. A spring 55 connected at one end to the lower end of the lenticular holder 16 and at the other to the main casing 27, constantly urges the bolt 48 into engagement with the push rod 49.

Because of the connections with the links 36, 37 and 43, movement of the push rod 49 in the manner indicated, will result in moving the lenticular holder 16, and the lenticular 14 carried thereby, in an arcuate path in its own plane. This arcuate path is indicated in Fig. 6 by the arrows 56. The lenticular holder 16 is sealed with respect to the main casing 27 by means of sealing strips 57 (see Fig. 10 in particular).

Also mounted within the main casing 27 and forwardly of the lenticular holder 16 is the margin frame 17, the purpose of which has been described above. This frame 17 is comprised of a rectangular plate having a rectangular opening therein suitably dimensioned to accomplish its stated purpose. The frame 17 is mounted to the main casing by double pivot hinges 58 in such manner that the frame may be moved in its own plane laterally in either direction depending upon the effect which it is desired to create in the finished picture. This movement is effected through the means of a pin 59 which extends forwardly from the link 36. The pin has a roller 60 thereon which engages an adjustable cam 61 carried by the frame 17 (see Figs. 4 and 5). The cam 61 is such that the arcuate movement of the pin 59 with the link 36 is translated into a straight horizontal movement of the frame 17. It is advisable to make the cam 61 adjustable so that the cam surface can be disposed either in positions resulting in lateral movement in either direction, or in various intermediate positions which would effect but minor lateral movement. Also preferably, the cam should be capable of adjustment to a position in which no lateral movement of the frame at all will be effected. Other suitable mechanism for moving the frame 17 laterally can of course be used.

Figure 10:
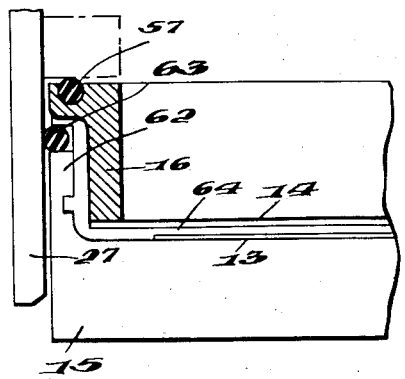
Fig. 10 is an enlarged sectional view taken on the line 10—10 of Fig. 7.
Figure 8:
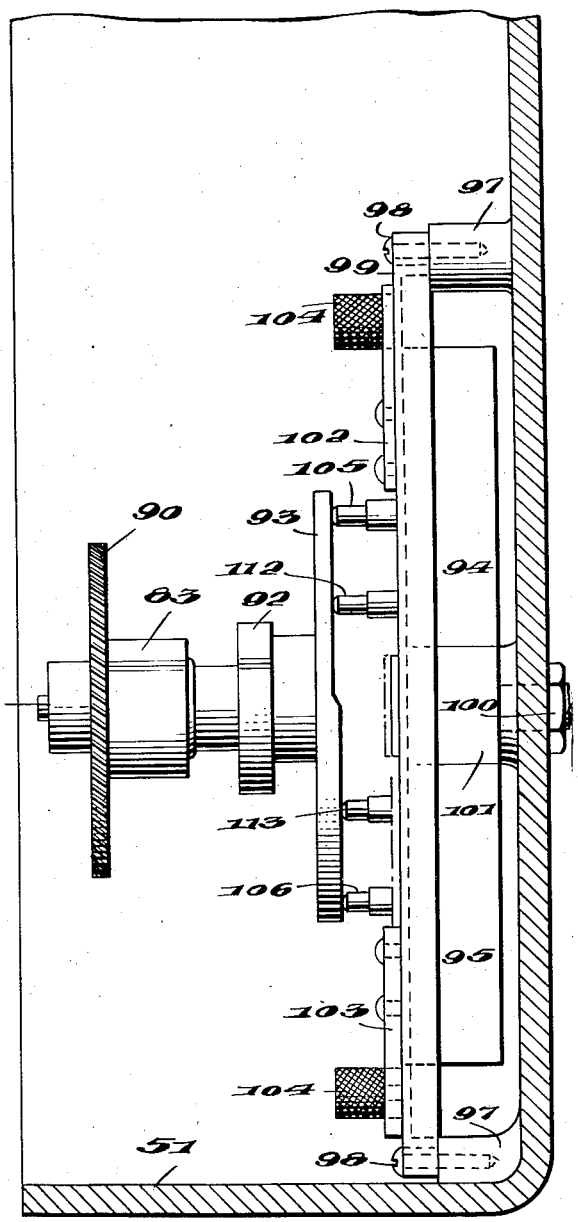
Fig. 8 is an enlarged plan view of the control unit taken on the line 8—8 of Fig. 4.
Figure 9:
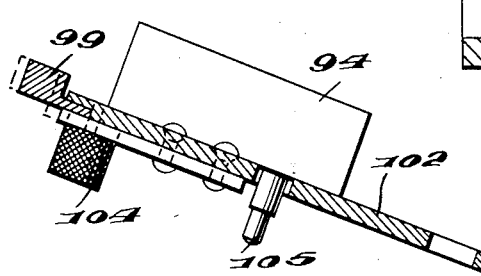
Fig. 9 is an enlarged detail, in section, of one of the adjustable switch arms shown in Fig. 8.
Figure 76:
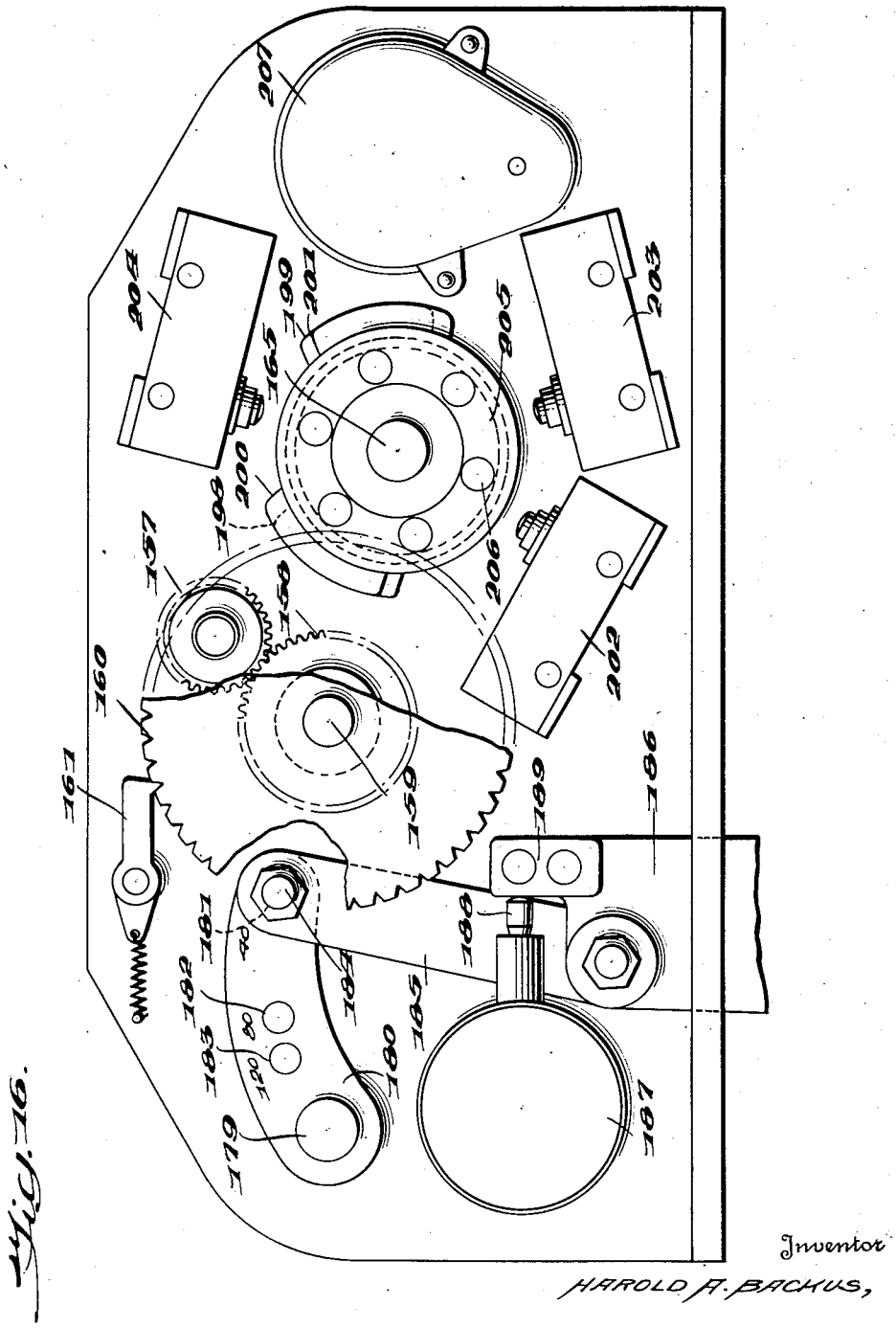

Reference is now made to the film holder 15 and the manner in which it may be positioned and removed from the rear open end of the main casing 27. The film holder 15 which comprises the back cover for the main casing 27 when it is in closed position, may be a rectangular flat plate provided around its periphery with a forwardly directed flange 62 which is adapted to be engaged in the rear opening of the casing in a space formed by the edge of the opening and the rearwardly stepped portion of the lenticular holder 16 (Fig. 10). A sealing strip 63 of rubber or the like provides an air-tight, and light-tight joint between the flange 62 of the film holder 15, the main casing 27 and the lenticular holder 16.

The arrangement is such that when the film holder 15 is in the position in which it closes the opening in the rear of the main casing, the film 13 will be slightly spaced from the lenticular 14. It will be noted from Fig. 10 that there is an air space 64 between the film 13 and the lenticular 14, as this is the preferable construction. The shoulder 31 on the main casing 27 is provided with an air passage 65 which extends to the air space. The film holder 15 is also provided with a passage 66 which leads from a vacuum source (not shown) to the back of the film. The vacuum thus maintains the film 13 tightly against the film holder 15. Air supplied through the air passage to the space between the lenticular 14 and the film 13 also aids in so maintaining the film against its holder and also in insuring that there be a proper space between the film and the lenticular.

The film could contact the face of the lenticular, but where the lenticular is plastic or the like relative movement between the two may cause the lenticular to become scratched.

The film holder 15 is inserted in place in the position indicated in Figs. 4 and 7 by holding it in a vertical plane and moving it bodily forward until the flange 62 is engaged as shown in Fig. 10. So that the film holder may be accurately positioned within the rear opening of the main casing 27, the casing (as shown in Fig. 7) is provided with a number of position adjusting screws 67, 68, and 69, the inner ends of which protrude inwardly into the rear opening along one side and the bottom thereof. These screws are threaded in the casing and can be secured in any adjusted position by means of the lock nuts provided for that purpose.

Means are provided for securing the film holder 15 in operative position and for quickly removing it, together with the film, after the picture has been taken and the film is ready for development. Such means is comprised of a plurality of quick-acting pivoted clamps 70 which are pivoted to the main casing 27 for swinging movement into and out of clamping position. In Fig. 4, one of the clamps 70 is shown in the upper part of the drawing figure in closed position in full lines and in partially open position in dotted lines. Each of these clamps is the same structurally and is comprised of a C-shaped portion one end of which is pivotally connected to the main frame (as at 71 in Fig. 4). The other end of each of the clamps 70 is provided with a hole which communicates with a cylinder 71. The stem 72 of a T-shaped operating handle 73 passes through the cylinder 71 and through the end of the C-shaped portion and this stem is urged inwardly by means of the coil spring 74 which is disposed within the cylinder 71 and which at one end bears against a collar 74' rigid with the stem 72 and at the other end against the end wall of the cylinder 71.

The reference numerals 75, 76, 77, and 78 (Fig. 7), indicate four lugs which extend laterally from the four corners of the film holder 15. In each of these there is threadedly mounted an adjusting stop bolt 79 which extends rearwardly and the position of which, after adjustment, can be set by means of the lock nuts 80. It will be noted, particularly from Fig. 4, that it is these stop bolts 79 which are adapted to be engaged by the spring pressed stems 72 of the handles 73 of the clamps 70 when the latter are in clamping position.

It should now be appreciated that when it is desired to lock the film holder in operative position on the rear of the main casing, it is only necessary to swing the clamps into place, pulling out the handles 73 of the clamps 70 until the clamps are in a position in which the stems 72 of the clamps are in alignment with the stop bolts 79. The handles are then released so that the stems engage and press against the stop bolts thus securing the film holder rigidly in closed position. Moreover, it should now be evident that to remove the film holder after a picture has been taken, it is merely necessary, if the camera is in a dark room, to pull out the handles of each of the clamps, swing the clamps to unlocked position, and then bodily remove the film holder. Removal of the film holder in this fashion is facilitated by grasping the lugs 75, 76, 77 and 78 which extend laterally from the film holder at its four corners as previously described. If it is desired to be able to remove the back when the camera is not in a dark room, the film holder should be provided with a slit (not shown) through which a dark slide can be inserted to protect the film from light before the film holder is removed.

Reference is now made to the control unit 51 which, as will be noted from Figs. 4 and 6 of the drawings, is removably secured to the upper part of the main casing 27 by means of screws or bolts 81. Within the lower part of the control unit 51 is a support member 82 (Fig. 4) which is provided with a vertical bore for the push rod 49 which extends upwardly therethrough. Depending from the top of the control unit 51 is a bracket support 83 for a gear assembly. Mounted in bearings in the bracket support 83 is a shaft 84 on which is rigidly mounted a gear 85. This shaft 84 extends rearwardly through the casing of the control unit 51 and the end thereof is provided with an operating handle or crank 86. The other end of the shaft 84 within the casing of the control unit 51 is provided with a rigid bevel gear 86 which is engaged by a bevel gear 87 on the end of a vertical shaft 88 which extends upwardly through the top of the casing of the control unit where it is connected by suitable gearing through a slip clutch (not shown) to be driven by the electric motor 89.

The gear 85 engages another gear 90 which is mounted on a shaft 91 supported for rotation in bearings in the bracket support 83. Mounted on the shaft 91 so as to rotate therewith is a cam 92 (Fig. 4) for controlling the movement of the lenticular holder 16, in a manner which will be described shortly. Also mounted on the shaft 91 so as to rotate therewith is another cam 93 the cam surface of which controls the actuation of limit switches 94 and 95 (Figs. 6 and 7) the purpose of which will be shortly described.

The cam 92 is adapted to be engaged by a roller 96 (Fig. 4) which is mounted in a bifurcated yoke 96' disposed on the upper end of the push rod 49, said push rod 49 being spring pressed in an upward direction into engagement with the surface of the cam 92 by the spring 55 (Fig. 6).

It will now be noted that operation of the motor 89 will revolve shaft 88 and through bevel gears 87 and 86 will rotate the shaft 84 and the gear 85. Rotation of the gear 85 causes rotation of the gear 90 and of the shaft 91 and of the two cams 92 and 93 mounted thereon. As the cam 92 is rotated, the push rod 49 will follow the cam surface and will be moved in an upward or downward direction as the case may be. Consequently, this movement of the push rod moves the arm 46 of the link 43 (Fig. 6) and through the mechanism described effects movement of the lenticular holder 16 in an arcuate path as indicated by the arrows 56 in Fig. 6.

As shown in Fig. 4, the cam 92, 93 can be set in any desired position by means of turning the crank 86 which actuates the gears 85, 90 and turns the shaft 91. Such setting movement is permitted by the slip clutch in the gear housing adjacent the motor 89.

Mounted on supports 97 within the control unit 51, by means of the screws 98, is a timing circle 99. Mounted on a stub shaft 100 supported by the boss 101 (Figs. 7 and 8) are two arms 102 and 103, each of which carries one of the shutter timing switches 94, 95. It will be noted that the position of the arms 102 and 103 may be adjusted with respect to the circle 99. In any adjusted position these arms 102 and 103 may be secured to the circle 99 by means of the shutter timing position clamp screws 104. Each of the timing switches carries a spring pressed plunger contact 105 and 106 respectively, both of which are adapted to engage the cam surface of the cam 93. The arrangement is such that as the cam 93 rotates first one and then the other of the switches 94 and 95 will be actuated. These switches are connected in a circuit which includes a solenoid for actuating the shutter of the camera so that as the first switch 94 is actuated by the cam 93, the shutter of the camera is opened and remains open until the cam actuates the second switch whereupon the shutter is closed. Adjustment of the arms 102 and 103 controls the position of the switches 94, 95, and consequently controls the time during which the shutter will be open for the taking of a picture.

The two switches 107, 108 (Fig. 7) are limit switches for controlling the movement of the lenticular holder 16. They are mounted on the support 109 by any suitable means such as by the bolts 110, 111. These switches 107, 108 each have a spring pressed plunger 112 and 113, respectively, which engage the cam surface of the cam 93. The actuation of the first switch 107 as the cam revolves, starts the electric motor 89 and through the mechanism described actuates the lenticular holder 16 through its arcuate path. This movement occurs during time that the shutter is open. The actuation of the second switch 108 shuts off the electric motor and stops the movement of the lenticular holder 16.

It will be noted, moreover, that as the lenticular holder 16 is moved, the margin frame 17 is also moved in a horizontal direction as has been previously described.

The movement of the lenticular holder 16, of the frame 17, and the opening and closing of the shutter of the camera, can all be made to synchronize with rotary movement of the platform 20 (Figs. 1 and 2) on which the objects being photographed have been placed. This can all be effected through a circuit which may be connected with the switches described through the socket or receptacle 114 shown in Fig. 6.

It is of course desirable to have an indicator on the control unit 51 so that the operator can observe the amount of movement of the lenticular holder 16. Such an indicator has been illustrated in the drawings (Figs. 6 and 7) where it is designated by the reference numeral 115. This may be a simple dial indicator, properly graduated, and provided with an indicating hand mounted to rotate about the dial. The movement of the hand may be controlled by a spring-pressed plunger 116 which engages the dial indicator operating arm 45. Consequently, as the arm 45 moves with movement of the lenticular holder 16, this movement is passed on to the plunger 116 which through the usual mechanism (not shown) operates the indicating hand to indicate the extent of movement of the lenticular holder.

Another control unit is illustrated in Figs. 11, 12, 13 and 14. This control unit which is generally indicated by the reference numeral 117, is so constructed that the arm 118 (which is the equivalent of arm 45) and which forms a part of the link 43 of the mechanism for moving the lenticular holder 16, carries a rack 119 which is engaged by a rotating pinion 120 (Fig. 13). Consequently, the lenticular holder 16 is actuated through this rack and pinion arrangement.

Mounted within the casing of the control unit 117 (Fig. 12) is a dial indicator 121, the dial 122 of which is adapted to be actuated through a spring pressed plunger 123 which engages an indicating plate 124 carried by the arm 118. It will be noted that movement of the arm 118 causes the dial to move on the indicator and that this indicator can thus indicate at all times the movement of the lenticular 14.

On the other side of the control unit 117 is a shutter time indicator 125 which may be driven by a small electric timing motor 126. The dial of this indicator is suitably marked (Fig. 11) so that the indicator hand will indicate the time in seconds that the shutter is open during the taking of a picture.

As shown in Fig. 12 the control unit casing is divided by a vertical partition 127 of rigid sheet material. This partition 127 supports both the dial indicator 121 for indicating the travel of the lenticular holder and also the dial indicator 125 for indicating the shutter time.

The mechanism for driving the pinion 120 and for controlling the time of motion of the lenticular holder 16 will now be described. In Fig. 12 the reference number 128 indicates a small electric motor, the drive shaft 129 of which is connected by a coupling element 130 to a shaft 131. The shaft 131 extends through the partition 127 and on its end is rigidly mounted a small pinion gear 132. This gear 132 engages a large gear 133 which is mounted on a shaft 134 mounted in bearings in the bearing box 135 secured to the partition 127. Mounted on the same shaft 134 is another large gear 136 and also a detent disc 137. The shaft 134 extends through the partition 127 towards the motor side of the control unit and on its end is rigidly mounted the pinion 120 which engages the rack as previously described.

The arrangement is such that the small gear 132 on shaft 131 drives the large gear 133 thus turning the shaft 134, such rotary movement of the shaft 134 causing rotation of the pinion 120 and actuation of the rack 119 thus moving the lenticular holder 16 in the manner which has been described hereinbefore.

The gears 132 and 133 are readily removable and may be replaced with gears of various sizes so as to change the rate of movement.

The detent disc 137 is provided on its periphery with a series of detents which are adapted to be engaged by a spring pressed ball 138 carried in a small holder secured to the base of the control unit as shown in Fig. 11.

The large gear 136 rotates with the shaft 134 and engages and drives the gear 139 which is mounted on a stub shaft 140 which is mounted in bearings within the bearing box 135. The shaft 140 extends rearwardly through the partition 127 and on its end has a cam 141 thereon which rotates with the shaft. Carried by the partition 127 are two limit switches 142 and 143, each provided with a spring pressed contact 144 and 145 respectively. These contacts 144 and 145 are disposed in the path of the cam 141 as it rotates. They are electrically connected in the circuit for the electric motor 128 so as to start and stop the motor and thus control the duration of movement of the lenticular holder 16.

The shaft 140 on its other end carries another cam 146. Disposed below this cam 146 and secured to the bearing box 135 is another switch 147 having a spring pressed contact 148 adapted to engage the cam 146 during its rotation. This cam is so designed as to control the time during which the camera shutter is open during the taking of the picture. The cams 141 and 146 are adapted to be replaced by other similar cams (not shown) which are provided with various cam surfaces providing for different operating times or these cams may be of an adjustable type. During normal motor driven operation the spring pressed ball 138 is removed so that the detent disc can rotate freely with the gearing.

The purpose of the detent disc 137 and spring pressed ball 138 is to permit the apparatus to be used for taking a succession of shots, one at a time. In such instances the gears are moved by hand (or they may be "jogged" by momentary contact of the motor switch), and the detent permits accurate step by step positioning of the lenticular in a lateral direction.

As previously indicated, it is desirable in some cases to provide means whereby the rate of motion of the lenticular holder 16 may be varied. For example, it has been found to be very advantageous in some cases to control the rate of motion of the lenticular 14 so that its motion is first fast, then slow, and finally fast again. The slower rate in this case would be through the middle part of the cycle in order to "bunch" the picture so as to allow the eyes to subtend an increased portion of the total "see around" motion included in the total lenticular width. It will be noted that this will be of increasing importance as the viewing is done from distances greater than arms length.

With bunched exposures, the middle part of the lenticular would be overexposed. It is proposed to vary the f/no. of the lens by stopping it down during this period of the cycle and thus gain the double benefit of reducing the width of the single image line made by the lens. With a narrower line the middle region of the lenticular can accommodate more lines per unit width with the same degree of overlap normally experienced.

In accordance with the invention, therefore, it is the object of the mechanism to be described to accelerate the motion imparted to the lenticular at the beginning and end of its travel and to slow it down distinctly during the middle of its stroke. Moreover, it has been found desirable at this stage simultaneously to reduce the aperture at the lens in order to keep substantially the same density in the resulting exposure. In fact, in actual practice, the exposure of the central portion of the negative may be made more dense so as to obtain slightly less density in the central portion of the positive so as to brighten up the central portion of the positive. This results in attracting more attention to this portion of the picture when viewed.

One means for accomplishing the variable motion of the lenticular 14 and of the aperture opening for the lens of the camera, is illustrated in Figs. 15, 16, and 17. These figures disclose a control unit 149, which, similarly to those heretofore described is adapted to be removably secured to the upper portion of the casing of the camera 10 as shown in Fig. 4.

The control unit 149 of Figs. 15, 16, and 17, is enclosed in a casing 150 which is divided intermediate its front and back by a partition 151. The front of the casing 150 is provided with a removable cover 152 which supports the electric motor 153, the drive shaft 154 of which (when the cover is in place) extends within the casing 150 and is adapted to connect with a coupling member 155. The coupling member 155 joins the shaft 154 of the motor with a shaft 156 which is supported by bearings mounted in the partition 151. The shaft 156 extends rearwardly of the partition and has a gear 157 mounted thereon to rotate therewith.

The gear 157 engages a gear 158 mounted on a shaft 159 which is supported by the partition 151. Mounted on the shaft 159, also, is a detent disc 160, the periphery of which is notched, and the notches being engaged by a spring pressed pivoted pawl 161. This pawl is constructed like a snap switch to snap to either side of a clutch position, and is shown in one of these positions. The shaft 159 extends forwardly through the partition and has a gear 162 mounted thereon near its end. The gear 162 will be referred to hereinafter as the "fast" gear. It is provided with gear teeth around substantially all of its periphery and may be secured to the shaft 159 by means of the set screw 163 located on the portion not having teeth.

The "fast" gear 163 engages a larger "slow" gear 164, or gear segment, which is mounted on a shaft 165 supported for rotation by the partition 151. This gear 164 may be secured to the shaft by means of set screw 166. The "slow" gear 164, in the embodiment shown is adapted to travel through 120 degrees while the "fast" gear 162 is adapted to travel through 240 degrees.

The "slow" gear 164 has a rigid pin 167 which extends laterally from the face thereof and which is engaged by a block 168. The block 168 has a circular bore therethrough in which a rod 169 is disposed and the block 168 and the rod 169 may be made rigid with respect to each other by means of the set screw 170.

The "fast" gear 162 also has a rigid pin 171 extending laterally from the face thereof, and this pin is engaged in a block 172 having a circular bore therethrough. The rod 169 extends through this bore with a sliding fit so that the block 172 can slide with respect to the rod 169.

Secured to the rod 169, by means of a set screw 173, is another block 174. This block 174 is pivotally connected (as at 175) with a link 176, which in turn is pivotally connected at its other end with an arm 177. The other end of the arm 177 is secured (by means of the set screws 178) to a shaft 179 which is supported for rotation by the partition 151 and which extends through the partition. Mounted on the end of the shaft 179 which so extends, and secured to turn with the shaft, is a link 180 of arcuate shape (Fig. 14). This link 180 is provided with a plurality of holes 181, 182, and 183, in any one of which may be disposed a pivot pin 184 by which the link 180 may be pivotally connected to another link 185 which is connected to the arm 186. The arm 186 is a part of the mechanism for moving the lenticular screen as previously described, and it should therefore be clear that any turning movement of the shaft 179 will thus effect a movement of the lenticular 14. It should also now be apparent that since the pivot pin 184 can be disposed in any one of the three holes 181, 182, or 183 in the link 180, it will be possible to vary the amplitude of movement of the lenticular screen. In the drawings the three holes referred to have adjacent thereto indicia signifying that one is for "40 lines per inch" while the other two are for "80" and "120" lines per inch respectively, permitting use of interchangeable lenticulars.

It should now be clear that the speed of motion of lenticular holder 16 is controlled by the movement of the rod 169 which is secured to the adjustable block 168, the block in turn being carried by the eccentrically disposed pin 167 extending from the face of the "slow" gear 164. Depending upon the position of the block 168 and the ratio of the gears 162 and 164, the movement transmitted to the shaft 179 can be varied. As indicated above, it is desired for purposes of the invention that this movement shall be fast at the beginning and end of the movement and slow in the intermediate portion, so that the movement of the lenticular screen will have a corresponding variation in speed of movement.

A dial indicator 187, which may be similar to those heretofore described, has a spring pressed plunger 188 for engaging an element 189 secured to the arm 186 so that the indicator will register the horizontal component of movement of the lenticular 14.

It has been mentioned that it is desirable, in accordance with the invention, to couple the movement of the lenticular screen with a corresponding variation in the extent of opening of the aperture for the lens of the camera by stopping it down during the middle part of the cycle of movement of the lenticular screen. One manner of accomplishing this result is illustrated in Figs. 15, 16, and 17. It will be noted that the slidable block 172 carries a pin 190 having a spherical or ball head which is engaged in a recess 191 in a rod 192. Near its other end the rod 192 has another recess 193 disposed at right angles to the first, and which engages (Fig. 15) the spherical head of a pin 194 rigid with a block 195 supported for turning movement from a bracket 196 secured to the partition 151. The block 195 has an arm 196 connected to a Bowden wire 197, the other end of which is connected (not shown) to the apparatus for controlling the size of opening of the aperture for the lens of the camera.

Any suitable type of aperture structure may be employed such as for example a rectangular aperture of adjustable width located directly behind the lens, and a slotted V-shaped element adapted to move across the opening.

It will be noted that the arrangement for varying the speed of travel of the lenticular and for varying the size of the aperture opening of the camera during the taking of the picture, is adjustable. The parts are so arranged that a quick change can be made from constant rate to a variable rate of lenticular movement. Also a variable amplitude of motion is desirable in order to accommodate various pitches for the lenticular screen. These are groups of features which are well accomplished by the differentially associated crank arms and connecting rods described. As is now apparent, the two eccentrics (blocks 168 and 172 carried by pins 167 and 171 respectively) can be connected to move the rod 169 with a variable rate of motion, being slowest at the mid stroke, this beam motion being transmitted to the link 176, arm 177 and to the shaft 179, then through the links 180 and 185 to the arm 186 of the mechanism for effecting the lenticular movement. It will also be appreciated that the aperture closing down and opening up motions are secured from the slidable block 172 carried by the eccentric pin 171, such motion being transmitted through the rod 192 to the Bowden wire 197, and thence to the aperture mechanism. The motion to the aperture would be secured at a position about 90 degrees out of phase with the eccentric providing the lenticular screen motion.

The shaft 165 for the "slow" gear 164 extends through the partition 151 and has mounted thereon for rotation therewith a number of cam elements 198, 199, 200 and 201. These cams are adapted when rotated to actuate the limit switches. The cam 198 actuates the limit switch 202. The cam 199 actuates the limit switch 203. The switches 202 and 203 are connected in an electrical circuit with the electrical motor 153 and the arrangement is such that actuation of the switches by the cams 198 and 199 will start and stop the motor thus controlling the movement which is imparted to the lenticular.

The cams 200 and 201 are adapted to actuate a single switch 204 which is connected in an electrical circuit provided with a solenoid for actuating the shutter of the camera. Thus rotation of the cams 200 and 201 will actuate the solenoid to open and close the shutter of the camera. In the drawings, all of the switches are shown in closed position.

It has been indicated that the cams are constructed so as to be adjustable. Because of this the time of movement of the lenticular and the time during which the shutter is open can be adjusted for any desired picture taking operation.

The cams may be made adjustable, for example, by constituting the wheel 205 which carries them of a plurality of discs secured together by screws 206 such as shown in Fig. 16. The cam elements may have portions disposed between the discs in such manner that when the screws are tightened the cams will be securely held in position. Other means for making the cams adjustable will occur to those skilled in the art.

It is of course desirable to record the total time of exposure. In Figs. 15 and 16 the reference numeral 207 indicates a shutter timing motor which, when the exposure begins, is energized to rotate an indicating hand with relation to a transparent dial 208. The surface of the dial 208 is suitably marked so that the operator may observe the total time of each exposure.

Mention has been made of the fact that certain of the elements described are connected in an electric circuit so as to effect the desired results. While the circuit arrangements may differ materially, one form of circuit is diagrammatically represented in Fig. 18.

At the top of this figure, there is indicated a shutter solenoid 209 for opening and closing the shutter of the camera, and also a platform motor 210 for rotating the platform on which the object to be photographed is placed.

Then there are the elements which are disposed in the camera back. These comprise the electric motor 153 for actuating the lenticular (indicated on drawing as "Lent motor"); the timer motor 207; the shutter switch 204; the limit switches 202, 203; all of which have been described in connection with Figs. 15, 16 and 17. Also there is a shutter relay 211.

The circuit may be supplied from a source 212 which may be a 110 v. line. This extends into the junction box, and then through a main switch 213 and through fuzes 214. In the junction box is a switch 215 for the shutter, which switch has contacts so that it may be operated both manually and automatically. Also in the circuit is a similar switch 216 for the platform motor, and also a switch 217 for the lenticular motor 151. The rectifiers and chokes are indicated at 218.

The circuit may also include a remote control 219 which includes three switches "S," "P," and "L," for the shutter solenoid, platform motor and lenticular motor, respectively.

It is not believed necessary to indicate the connecting wires individually, but it will be apparent from the circuit diagram and in view of the preceding description that the lenticular motor, shutter solenoid and platform motor may all be actuated simultaneously either through manual control or automatic control and also that when desired any one of the three may be cut off or started again by the switches in the remote control 219.

It should be appreciated that it is most important in all of the embodiments that the mechanism for moving the elements should be very accurately proportioned, machined and positioned so that the movement will be smooth, sure and accurate. This is especially true of the triple linkage for supporting and moving the lenticular holder.

In all of the embodiments of the inventions described the film or plate comprising the sensitized surface is held stationary while the lenticular is mounted for lateral movement in its own plane. The invention contemplates that the situation may be reversed. For example, the lenticular may be held stationary in the casing and the film or plate holder may be mounted for movement in its own plane. In such event the mounting means for the plate holder may be similar to that employed for the lenticular in the embodiments described above.

It is also within the scope of this invention to move the lens relatively to the sensitized plate or film or to the lenticular, or to both. While no means have been illustrated for accomplishing movement of the lens in such fashion, cameras provided with means for moving the lens with respect to the film or plate are known in the patented art.

In the embodiments illustrated in the drawings the margin frame is designed to be moved relatively to the lenticular. It is within the scope of this invention also to move the margin frame relatively with respect to the sensitized plate or film, while the lenticular preferably remains stationary.

Moreover, in one of the embodiments illustrated where the lenticular is moved relatively to the sensitized plate or film, the movement of the lenticular is controlled so that it moves at a variable rate of speed which is faster at the beginning and end than in the middle. In accordance with the invention it is also possible to obtain somewhat the same result by keeping the relative movement between the sensitized surface (the plate) and the lenticular constant, but by changing the speed of relative movement between the camera and the object being photographed. However, in such instance, where the object is the element being moved, its speed of movement during the taking of the picture should be slower at the beginning and the end than during the intermediate part.

Finally, it has been mentioned that the pictures produced by the methods and apparatus described are a composite image containing parallel panel views of an object field as seen from a plurality of points of view, such an image being a composite image composed of a plurality of such panels, different panels containing different portions of the object field on which the camera is focussed. To obtain the best results it has been found that a single portion of the object field must occur on a plurality of panels in order to have any appreciable depth of view. In accordance with the invention the best results are obtained when a point object is spread over one fourth to three-eighths inches of image width, equivalent to 20–30 panels in a lenticular having 80 lines to the inch.

In the description and drawings only one type of lenticular has been mentioned and illustrated. It should be evident that in some cases it will be possible to employ other types of lenticulars, or also to employ grids, of the various types well known in the prior art. In the claims, where the word "lenticular" is employed, it is intended that the word should be broadly interpreted to cover various types of lenticulars or grids unless the claims contain other limiting language which would restrict the lenticular to a specific type.

It should, moreover, be evident that each of the embodiments of the invention disclosed provides a detent arrangement which permits the use of multiple, spaced exposures instead of a continuous exposure. Such is very advantageous under some circumstances. It should also be clear that a rotary type shutter can effect this type of exposure without actually stopping the platform and the other moving elements between set-ups for exposures.

Now that various embodiments of the invention have been described, other modifications may suggest themselves to those skilled in the art. The invention is not to be limited to the embodiments illustrated and described, except as indicated by the scope of the claims which follow.

I claim:

1. The photographic method comprising the following steps; exposing a sensitized surface having in front of it a transparent lenticular member, and during actual exposure continuously changing the relative position of said surface and said member, and varying the speed of said change so that it is slower in the middle than at the beginning or end.

2. A method of making stereoscopic pictures which comprises the steps of effecting relative movement between the object being photographed and the sensitized surface and simultaneously effecting relative movement between the sensitized surface and a lenticular member, or the like, disposed between the sensitized surface and the object being photographed, said last-named movement being faster at the beginning and end than during the intermediate part.

3. A method of making stereoscopic pictures with a camera provided with a lenticular member between the lens and the sensitized surface, comprising, the steps of effecting relative movement between the camera and the object being photographed in a direction laterally of the lenticulars, and simultaneously effecting relative lateral movement between the lenticular member and the sensitized surface, said last-named relative lateral movement being faster at the beginning and end of the movement than during the intermediate part.

4. An apparatus for taking stereoscopic pictures which comprises a camera, a lenticular member in said camera and disposed between the sensitized surface and the lens, means for moving the lenticular member relatively to said sensitized surface, and means for varying the speed of said movement as it occurs so that it is faster at the beginning and end of the movement than during the intermediate part.

5. An apparatus for taking stereoscopic pictures which comprises, a camera, a transparent lenticular member in said camera and disposed between the sensitized surface and the lens, and parallel to the sensitized surface, means for moving the lenticular member in its own plane laterally, and means for varying the speed of said movement as it occurs so that it is faster at the beginning and end of the movement than during the intermediate part.

6. An apparatus for taking stereoscopic pictures which comprises a camera provided with a transparent lenticular member between the photo-sensitized surface and the lens, means for effecting relative lateral movement between the camera and the object being photographed, and means for simultaneously effecting relative lateral movement of the lenticular member and the sensitized surface, and means for varying said last-named movement as it occurs so that it will be faster at the beginning and the end than during the intermediate part.

7. Apparatus for use in taking stereoscopic pictures, comprising, a casing adapted to be secured to the rear end of a camera, a film holder, means for removably securing the film holder to the rear open end of the casing, a transparent lenticular member, a lenticular holder within said casing adjacent to the film holder, a plurality of links pivotally connecting the lenticular holder to the casing for movement of the lenticular holder in its own plane in an arcuate path, and means engaging said lenticular holder and for moving it in said path to effect a relative lateral movement of the lenticular member with respect to the film.

8. Apparatus for use in taking stereoscopic pictures, comprising, a casing adapted to be secured to the rear end of a camera, a film holder, means for removably securing the film holder to the rear open end of the casing, a transparent lenticular member, a lenticular holder within said casing adjacent to the film holder, a plurality of links pivotally connecting the lenticular holder to the casing for movement of the lenticular holder in its own plane in an arcuate path, means for moving said lenticular holder in said arcuate path, a margin frame within said casing and disposed forwardly of the lenticular holder in the direction of the lens of the camera, and cam means actuated by movement of one of said links for effecting lateral movement of said margin frame within said casing.

9. In a camera arrangement for the taking of stereoscopic pictures and the like, an open ended casing disposed on the rear open end of a camera, a back removably secured to the open end of the casing, means on said back for supporting a photographic plate, film or the like, a transparent lenticular, a frame for supporting said lenticular in a position parallel to and forwardly of the film or plate in the direction of the lens, a pair of links pivotally connecting a portion of said lenticular holder with said casing, a link pivotally connecting another portion of said lenticular holder to said casing, and means engaging a portion of said lenticular holder for moving the lenticular holder in an arcuate path as permitted by said links.

10. In a camera arrangement for the taking of stereoscopic pictures and the like, an open ended casing disposed on the rear open end of a camera, a back removably secured to the open end of the casing, means on said back for supporting a photographic plate, film or the like, a transparent lenticular, a frame for supporting said lenticular in a position parallel to and forwardly of the film or plate in the direction of the lens, a pair of links pivotally connecting a portion of said lenticular holder with said casing, a link pivotally connecting another portion of said lenticular holder to said casing, means engaging a portion of said lenticular holder for moving the lenticular holder in an arcuate path as permitted by said links, a margin frame disposed in said casing forwardly of said lenticular holder in the direction of the lens, means for supporting said margin frame by said casing for relative lateral movement between the margin frame and the lenticular holder, and means actuated by one of said links upon movement thereof for moving said margin frame laterally with respect to said lenticular holder.

11. A camera arrangement for the taking of stereoscopic pictures and the like, comprising, a casing disposed on the rear end of a camera, a film or plate holder supported by said casing, a lenticular member, a lenticular holder disposed forwardly of said plate holder in the direction of the lens for supporting said lenticular member in spaced parallel relationship to the plate or film but adjacent thereto, a pair of links pivotally connecting a portion of the lenticular holder and one part of the casing, a link pivotally connecting another portion of the lenticular holder to an opposite part of the casing, said pivotal connections being positioned to support the lenticular holder for movement in an arcuate path in its own plane, a control unit, said lenticular holder having a portion extending into said control unit, and means within said control unit for engaging said extending portion and for moving the lenticular in an arcuate path.

12. A camera arrangement for taking stereoscopic pictures or the like, comprising, a camera, a lenticular member disposed adjacent to the film between the latter and the lens, means for supporting the lenticular for lateral movement in its own plane relatively to the film, a control mechanism for so moving said lenticular member, said control mechanism including an element connected with the lenticular member, a link connecting said last-named element with a rotatable shaft, means for imparting a rotary movement to said shaft, and means for varying said rotary movement so that the lateral movement of the lenticular member is faster at the beginning and end than during the intermediate part.

13. A camera arrangement for taking stereoscopic pictures or the like, comprising, a camera, a lenticular member disposed adjacent to the film between the latter and the lens, means for supporting the lenticular for lateral movement in its own plane relatively to the film, a control mechanism for so moving said lenticular member, said control mechanism including an element connected with the lenticular member, a link connecting said last-named element with a rotatable shaft, means for imparting rotary movement to said shaft, and means for varying said rotary movement so that the lateral movement of the lenticular member is faster at the beginning and end than during the intermediate part, and mechanism associated with said last-named means and connected with the aperture structure of the lens of the camera for reducing the size of the aperture in proportion to said variation of said rotary movement so that said aperture will be smaller during the intermediate part of the lateral movement of said lenticular.

14. A camera arrangement for taking stereoscopic pictures or the like, comprising, a camera, a lenticular member disposed adjacent to the film between the latter and the lens, means for supporting the lenticular for lateral movement in its own plane relatively to the film, a control mechanism for so moving said lenticular member, said control mechanism including an element connected with the lenticular member, a link connecting said last-named element with a rotatable shaft, means for imparting rotary movement to said shaft, and means for varying said rotary movement so that the lateral movement of the lenticular member is faster at the beginning and end than during the intermediate part, and motor means for actuating said means for imparting rotary movement to said shaft, rotatable cam means driven by said motor means, means actuated by said cam means for opening and closing the shutter of the camera during the movement of the lenticular.

15. A camera arrangement for taking stereoscopic pictures or the like, comprising, a camera, a lenticular member disposed adjacent to the film between the latter and the lens, means for supporting the lenticular for lateral movement in its own plane relatively to the film, a control mechanism for so moving said lenticular member, said control mechanism including an element connected with the lenticular member, a link connecting said last-named element with a rotatable shaft, means for imparting rotary movement to said shaft, and means for varying said rotary movement so that the lateral movement of the lenticular member is faster at the beginning and end than during the intermediate part, and motor means for actuating said means for imparting rotary movement to said shaft, rotatable cam means driven by said motor means, means actuated by said cam means for opening and closing the shutter of the camera during the movement of the lenticular, and mechanism associated with said means for imparting rotary movement and connected with the aperture structure of the lens of the camera for reducing the size of the aperture out so that said aperture will be smaller during the intermediate part of the lateral movement of said lenticular.

16. A camera arrangement for taking stereoscopic pictures or the like, comprising, a camera, a lenticular member disposed adjacent to the film between the latter and the lens, means for supporting the lenticular for lateral movement in its own plane relatively to the film, a control mechanism for so moving said lenticular member, said control mechanism including an element connected with the lenticular member, a link connecting said last-named element with a rotatable shaft, means for imparting reciprocatory movement to said shaft, comprising engaging small and large gears, means for driving said gears, a rod, a block adjustably secured to said rod, a pin eccentrically disposed with respect to the axis of said large gear and extending from the face of the gear, said block being carried by said pin, a second block slidably mounted on said rod, said second block being carried by a similar eccentric pin extending from the face of the small gear, a third block adjustably mounted on said rod, and a link and an arm connecting said third block with said shaft.

17. A camera arrangement for taking stereoscopic pictures or the like, comprising, a camera, a lenticular member disposed adjacent to the film between the latter and the lens, means for supporting the lenticular for lateral movement in its own plane relatively to the film, a control mechanism for so moving said lenticular member, said control mechanism including an element connected with the lenticular member, a link connecting said last-named element with a rotatable shaft, means for imparting reciprocatory movement to said shaft, comprising engaging small and large gears, means for driving said gears, a rod, a block adjustably secured to said rod, a pin eccentrically disposed with respect to the axis of said large gear and extending from the face of the gear, said block being carried by said pin, a second block slidably mounted on said rod, said second block being carried by a similar eccentric pin extending from the face of the small gear, a third block adjustably mounted on said rod, and a link and an arm connecting said third block with said shaft, and means connected with said second block to be actuated by movement thereof for controlling the size of the aperture opening for the lens of the camera.

18. A method of making stereoscopic pictures which comprises the steps of disposing between the object to be photographed and a sensitized surface an element capable of exposing parallel areas only of the sensitized surface, effecting relative movement between the sensitized surface and the object, and simultaneously effecting relative lateral movement between the sensitized surface and the element, and controlling said relative movements so that one of them is at a constant rate of speed while the other is at a rate of speed which varies so as to be faster at the beginning and end of the movement than in the intermediate part.

19. A method of making stereoscopic pictures which comprises the steps of disposing between the object being photographed and a sensitized surface an element capable of exposing parallel areas only of the sensitized surface, effecting relative lateral movement between the sensitized surface and the object, and simultaneously effecting relative lateral movement between the sensitized surface and the element, controlling the relative lateral movement between the sensitized surface and the element so as to maintain it constant, and controlling the relative movement between the sensitized surface and the object so that it varies in speed so as to be faster at the beginning and end of the movement than in the intermediate part.

20. A method of making stereoscopic pictures which comprises the steps of disposing between the object being photographed and a sensitized surface an element capable of exposing parallel areas only of the sensitized surface, effecting relative lateral movement between the sensitized surface and the object, and simultaneously effecting relative lateral movement between the sensitized surface and the element, controlling the relative lateral movement between the sensitized surface and the element so as to maintain it constant, and controlling the relative movement between the sensitized surface and the object so that it varies in speed, being slower at the beginning and end of the movement than in the middle.

21. An apparatus for taking stereoscopic pictures, comprising, a casing, a sensitized surface supported within said casing, said casing having a closable opening, a member supported within the casing between said opening and said sensitized surface, said member having means for exposing a plurality of parallel restricted areas only of said sensitized surface, means for effecting relative lateral movement between said member and said sensitized surface, and means for varying the speed of said relative movement as it occurs so that it will be faster at the beginning and end than in the middle.

22. An apparatus for taking steroscopic pictures, comprising, a casing, a sensitized surface supported within said casing, said casing having a closable opening, a member supported within the casing between said opening and said sensitized surface, said member having means for exposing a plurality of parallel restricted areas only of said sensitized surface, means for effecting relative lateral movement between said member and said sensitized surface, means for varying the speed of said relative movement as it occurs so that it will be faster at the beginning and end than in the middle, and means for simultaneously controlling the size of said opening so that it will be smaller during the middle of said movement than at the beginning and the end thereof.

23. An apparatus for taking stereoscopic pictures, which comprises, a camera, a lens and a sensitized surface supported within said camera, a member disposed between said lens and said sensitized surface, said member having means for exposing a plurality of restricted areas only of the sensitized surface, means for effecting relative movement between at least two of said elements, and means for varying at least one of said relative movements as it occurs. so that it is faster at the beginning and end than in the intermediate part.

HAROLD A. BACKUS.

REFERENCES CITED

The following references are of record in the file of this patent:

UNITED STATES PATENTS

| Number | Name | Date |
| --- | --- | --- |
| 1,066,766 | Spiegel | July 8, 1913 |
| 1,260,682 | Kanolt | Mar. 26, 1918 |
| 1,977,310 | Kanolt | Oct. 16, 1934 |
| 2,150,932 | McDonnell | Mar. 21, 1939 |
| 2,175,114 | Friedmann | Oct. 3, 1939 |
| 2,318,983 | Winnek | May 11, 1943 |